(12) United States Patent
Gabe et al.

(10) Patent No.: US 8,051,642 B2
(45) Date of Patent: Nov. 8, 2011

(54) METHOD OF CONTROLLING NOX PURIFICATION SYSTEM AND NOX PURIFICATION SYSTEM

(75) Inventors: Masashi Gabe, Fujisawa (JP); Daiji Nagaoka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 415 days.

(21) Appl. No.: 12/224,490

(22) PCT Filed: Nov. 22, 2006

(86) PCT No.: PCT/JP2006/323296
§ 371 (c)(1),
(2), (4) Date: Aug. 28, 2008

(87) PCT Pub. No.: WO2007/110997
PCT Pub. Date: Oct. 4, 2007

(65) Prior Publication Data
US 2009/0044516 A1 Feb. 19, 2009

(30) Foreign Application Priority Data
Mar. 24, 2006 (JP) ................. 2006-082200

(51) Int. Cl.
*F01N 3/18* (2006.01)
(52) U.S. Cl. .......................... 60/285; 60/295
(58) Field of Classification Search ......... 60/285, 60/299, 301, 277, 286, 295
See application file for complete search history.

(56) References Cited

U.S. PATENT DOCUMENTS

| 6,216,449 B1 * | 4/2001 | Strehlau et al. ............. 60/274 |
| 6,357,224 B1 | 3/2002 | Kawamoto et al. |
| 2004/0163381 A1 * | 8/2004 | Shirakawa et al. ............ 60/285 |

FOREIGN PATENT DOCUMENTS

| CN | 1542264 | 11/2004 |
| JP | 11-324654 | 11/1999 |
| JP | 2000-51662 | 2/2000 |
| JP | 2004-51662 | 2/2000 |
| JP | 2000-352307 | 12/2000 |
| JP | 2002-364428 | 12/2002 |
| JP | 2003-301717 | 10/2003 |
| JP | 2004-60518 | 2/2004 |
| JP | 2004-176611 | 6/2004 |
| JP | 2004-257324 | 9/2004 |

OTHER PUBLICATIONS

International Search Report for corresponding application PCT/JP2006/323296.
Patent Abstracts of Japan, Publication No. 2000-51662, Published Feb. 22, 2000.
Patent Abstracts of Japan, Publication No. 2004-60518, Published Feb. 26, 2004.

* cited by examiner

*Primary Examiner* — Thomas Denion
*Assistant Examiner* — Jonathan Matthias
(74) *Attorney, Agent, or Firm* — Staas & Halsey LLP

(57) ABSTRACT

Method of controlling an NOx purification system provided with an NOx occlusion reduction catalyst and a control unit that conducts NOx regeneration control and sulfur poisoning regeneration control. A degree of deterioration of the NOx occlusion reduction catalyst due to sulfur poisoning is estimated on the basis of an amount of an integrated value of a difference between an oxygen concentration on an outlet side of the NOx occlusion reduction catalyst and an oxygen concentration on an inlet side thereof. In so doing, the amount of sulfur poisoning in the NOx occlusion reduction catalyst is accurately estimated, excessive sulfur poisoning regeneration can be avoided, and fuel consumption can be reduced.

4 Claims, 2 Drawing Sheets

METHOD OF CONTROLLING NOX PURIFICATION SYSTEM AND NOX PURIFICATION SYSTEM

CROSS REFERENCE TO RELATED APPLICATIONS

This application claims the benefit under 35 U.S.C. Section 371, of PCT International Application Number PCT/JP2006/323296, filed Nov. 22, 2006 and Japanese Application No. 2006-082200, filed Mar. 24, 2006 in Japan, the contents of which are incorporated herein by reference.

TECHNICAL FIELD

The present invention relates to a method of controlling an NOx purification system and an NOx purification system provided with an NOx occlusion reduction catalyst that purifies NOx (nitrogen oxides) present in an exhaust gas of an internal combustion engine.

BACKGROUND ART

Regulations are becoming stricter every year regarding substances such as PM (particulate matter), NOx, CO, and HC exhausted from diesel engines. With such regulations becoming stricter, it has been difficult to meet the regulated values by only improving the engines. Consequently, technologies have been adopted wherein an exhaust gas post-treatment device is installed in the exhaust passage of the engine, and the amounts of these substances exhausted from the engine are reduced.

This being the case, a variety of research and proposals have been made regarding the use of NOx catalysts for elimination by reduction of NOx (nitrogen oxides) from the exhaust gas of internal combustion engines such as diesel engines and certain types of gasoline engines, as well as various combustion equipment. One of these involves using an NOx occlusion reduction catalyst as an NOx reduction catalyst for the diesel engines. By using the NOx occlusion reduction catalyst, the exhaust gas can be effectively purified of NOx therein.

The NOx occlusion reduction catalyst is formed as a monolith honeycomb or the like. On the support body of the monolith honeycomb are formed a large number of polygonal cells, the support body being formed of a structural material of cordierite, silicon carbide (SiC), or stainless steel. On the wall surfaces of these cells there is provided a porous catalyst coat layer acting as the catalyst support layer and formed of alumina ($Al_2O_3$) or the like. The surface of the catalyst coat layer supports a catalyst noble metal having an oxidation function, such as platinum (Pt), and an NOx occluding agent (NOx occlusion substance, NOx occlusion material, NOx absorbing agent) formed of several of alkali metals, alkaline earth metals, and rare earth elements having an NOx occlusion function. Such alkali metals include potassium (K), sodium (Na), lithium (Li), and cesium (Cs). Such alkaline earth metals include barium (Ba) and calcium (Ca). In addition, such rare earth metals include lanthanum (La) and yttrium (Y). With these components, two functions of NOx occlusion and NOx release/purification are exhibited, depending on the oxygen concentration in the exhaust gas.

Additionally, the NOx occlusion reduction catalyst occludes the NOx with the NOx occluding agent during regular operation. When the occlusion ability of the catalyst nears saturation, the air-fuel ratio of the inflowing exhaust gas is put into a rich state at an appropriate time, whereby the NOx occluded by the catalyst is released, while at the same time the released NOx is reduced by the three-way action of the catalyst noble metal.

More specifically, in the case where the air-fuel ratio of the exhaust gas is in a lean state where oxygen ($O_2$) is present in the exhaust gas of ordinary diesel engines or lean combustion gasoline engines, nitrogen monoxide (NO) exhausted from the engine is oxidized to nitrogen dioxide ($NO_2$) by the oxidation catalytic function of the catalytic noble metal using the oxygen present in the exhaust gas. Subsequently, the nitrogen dioxide is occluded in the form of a salt such as nitrate by the NOx occlusion agent having the NOx occlusion ability, such as barium, thus purifying the NOx.

However, when this state is continued, the NOx occluding agent having the NOx occlusion ability will be entirely transformed into the nitrate, and the NOx occlusion ability will be lost. Consequently, an exhaust gas with an exceedingly high concentration of a fuel (rich spike gas) is created by changing the operational parameters of the engine or by injecting the fuel into the exhaust passage, and this rich spike gas is then sent to the catalyst. The rich spike gas is a high-temperature exhaust gas having a high concentration of reducing agents such as carbon monoxide (CO) and hydrocarbons (HC), wherein oxygen is not present.

When the exhaust gas is thus put into a rich air-fuel ratio state wherein oxygen is not present in the exhaust gas, the concentration of the reducing agents is high, and the exhaust gas temperature is raised, the nitrate formed by the occlusion of NOx releases the nitrogen dioxide and returns to the original barium or other catalyst substance. Since oxygen is not present in the exhaust gas, the released nitrogen dioxide is reduced to nitrogen ($N_2$) and purified by the oxidation function of the supported noble metal, using the carbon monoxide, hydrocarbons (HC), and hydrogen ($H_2$) present in the exhaust gas as the reducing agents.

For this reason, when the NOx occlusion ability nears saturation in an NOx purification system provided with the NOx occlusion reduction catalyst, the exhaust gas having a reducing composition is supplied to the catalyst in order to release the occluded NOx and regenerate the catalyst. The exhaust gas having a reducing composition is generated through making an amount of the fuel greater than that in a theoretical air-fuel ratio, thereby putting the air-fuel ratio of the exhaust gas in the rich state, and through decreasing the oxygen concentration of the inflowing exhaust gas. By conducting rich control for recovery of the NOx occlusion ability, the occluded NOx is released and regeneration operation is conducted, by which the released NOx is reduced by the catalyst noble metal.

Additionally, in order to make the NOx occlusion reduction catalyst function effectively, it is necessary to supply in the rich state the amount of the reducing agent necessary and sufficient for reducing the NOx that is occluded in the lean state. In the diesel engine, when the rich state is realized using fuel-related means only, fuel consumption worsens. For this reason, air intake is throttled using a throttle valve while the intake amount is also reduced by opening an EGR valve and supplying a large amount of an EGR gas. In addition, the fuel is added in order to deepen the rich state, and in-cylinder combustion is switched to rich combustion.

Meanwhile, in the internal combustion engines, the burning of the fuel or engine oil causes the sulfur contained in the fuel or engine oil to be produced in a combustion gas as sulfur dioxide ($SO_2$). When the sulfur dioxide present in the exhaust gas reaches the surface of the NOx occlusion reduction catalyst, the sulfur dioxide becomes sulfur trioxide ($SO_3$) and is occluded instead of the nitrogen dioxide, and additionally, adsorbed at the catalyst surface. Under low-temperature exhaust gas conditions wherein the exhaust gas temperature is approximately 600° C. or less and in the normal operating range of the internal combustion engine, the occluded sulfur dioxide is hardly released. For this reason, the occluded sulfur dioxide becomes the cause of sulfur poisoning, wherein the occlusion ability of the NOx occlusion reduction catalyst is worsened.

Consequently, for the NOx occlusion reduction catalyst, it is necessary to periodically control the engine operational parameters, supply the high-temperature and rich-state exhaust gas to the catalyst, and conduct a sulfur purge to release the occluded and adsorbed sulfur from the catalyst and regenerate the catalyst from sulfur poisoning (hereinafter, this process will be referred to as sulfur poisoning regeneration). However, since the high-temperature and rich spike gas is necessary for conducting this sulfur poisoning regeneration, there is a problem that this leads to a remarkable worsening of fuel consumption. For this reason, it is desirable to conduct the sulfur poisoning regeneration only as frequently as is necessary.

As one NOx purification device of the related art, an exhaust gas purification system for an internal combustion engine has been proposed such as that disclosed in Japanese Patent Application Kokai Publication No. 2000-51662, for example. In this device, the amount of sulfur oxides (SOx) occluded by an occlusion type NOx catalyst (NOx occlusion reduction catalyst) is accurately estimated. In order to efficiently eliminate the occluded SOx, the degree of occlusion of sulfur components is computed according to at least one from among the air-fuel ratio, fuel properties, and catalyst temperature. The deposited amount of sulfur components is then estimated based on a value correlated to a fuel injection amount and the degree of occlusion of sulfur components.

However, in this exhaust gas purification system for an internal combustion engine, estimation is conducted indirectly on the basis of the state of the fuel, and thus estimation is not conducted on the basis of the state of the catalyst. Consequently, the degree of catalyst deterioration due to sulfur poisoning cannot be accurately estimated. Therefore, the degree of catalyst deterioration is calculated to be much greater than the actual value, for safety reasons. As a result, the frequency of sulfur poisoning regeneration increases, and this causes excessive worsening of fuel consumption.

On the other hand, an exhaust gas purification device for an internal combustion engine has been proposed such as that disclosed in Japanese Patent Application Kokai Publication No. 2004-60518, for example. In this device, an NOx concentration sensor is disposed in the exhaust passage downstream of the NOx catalyst. Upon resuming NOx occlusion after shifting from an NOx purge mode, based on the time rate of change in an NOx concentration detected by the NOx concentration sensor, when the time rate of change in the NOx concentration is larger than a reference value, the deterioration of the NOx catalyst is taken to be due to sulfur poisoning. In addition, when the time rate of change in the NOx concentration is smaller than the reference value, the deterioration of the NOx catalyst is taken to be due to thermal deterioration. Subsequently, when the deterioration is due to sulfur poisoning, the sulfur purge is conducted. However, there is a problem that the NOx concentration sensor is still expensive, and for this reason, it is difficult to use the NOx concentration sensor in mass-produced products.

Patent Literature 1: Japanese Patent Application Kokai Publication No. 2000-51662
Patent Literature 2: Japanese Patent Application Kokai Publication No. 2004-60518

SUMMARY OF THE INVENTION

Problem to be Solved by the Invention

The present invention, being devised in order to solve the foregoing problems, has as an object to provide an NOx purification method and NOx purification system wherein an amount of sulfur poisoning can be estimated accurately, by performing sulfur poisoning regeneration at suitable intervals, excessive sulfur poisoning regeneration can be avoided, and worsening of fuel consumption can be prevented.

A method of controlling an NOx purification system for achieving the above-mentioned objects involves the following. The NOx purification system is provided with an NOx occlusion reduction catalyst that occludes NOx when the air-fuel ratio of exhaust gas in the exhaust passage of an internal combustion engine is in a lean state, and additionally, releases and reduces occluded NOx when in a rich state. In addition, the NOx purification system conducts an NOx regeneration control that brings an air-fuel ratio of an exhaust gas to a rich state in order to recover an NOx occlusion ability of the NOx occlusion reduction catalyst. In addition, the NOx purification system conducts sulfur poisoning regeneration control that brings the air-fuel ratio of the exhaust gas to the rich state in order to recover from catalyst deterioration due to sulfur poisoning of the NOx occlusion reduction catalyst. The method of controlling the NOx purification system includes the step of estimating a degree of deterioration due to sulfur poisoning of the NOx occlusion reduction catalyst on the basis of an amount of oxygen adsorbed and occluded by the NOx occlusion reduction catalyst immediately after terminating the rich air-fuel state of the NOx regeneration control. The oxygen concentration also includes different expressions of the oxygen concentration in the exhaust gas, such as the air-fuel ratio or the excess coefficient.

In the NOx occlusion reduction catalyst, when an internal combustion engine reverts to lean combustion (ordinary combustion) after terminating rich combustion for regenerating the NOx, the oxygen present in the lean state exhaust gas is picked up by adsorption and occlusion on the catalyst surface of the NOx occlusion reduction catalyst or within an NOx occlusion agent. When the NOx occlusion reduction catalyst is deteriorated due to sulfur poisoning, the amount of oxygen picked up by adsorption and occlusion is reduced according to the degree of deterioration. Consequently, by estimating the degree of deterioration of the NOx occlusion reduction catalyst due to sulfur poisoning on the basis of the amount of the oxygen adsorbed by the NOx occlusion reduction catalyst immediately after terminating the rich air-fuel state of the NOx regeneration control, the degree of deterioration can be estimated more accurately than in the case of an indirect estimation method that uses the amount of fuel consumption or similar amount that is not directly related to the state of the NOx occlusion reduction catalyst.

Alternatively, in the above-mentioned method of controlling the NOx purification system, immediately after terminating the rich air-fuel state of the NOx regeneration control, the degree of deterioration in the NOx occlusion reduction catalyst due to sulfur poisoning is estimated from an integrated value of a difference between the oxygen concentration on an outlet side of the NOx occlusion reduction catalyst and the oxygen concentration on an inlet side of the NOx occlusion reduction catalyst, instead of the amount of the adsorbed and occluded oxygen.

The oxygen in the lean exhaust gas is adsorbed and occluded by the NOx occlusion reduction catalyst immediately after terminating the rich air-fuel state of the NOx regeneration control. For this reason, as shown in FIG. 2, differences occur between the air excess coefficient λin on the inlet side of the catalyst and the air excess coefficient λout on the outlet side of the catalyst. The integrated value A obtained by summing these differences is an amount related to the amount of the adsorbed and occluded oxygen Va. More specifically, multiplying the integrated value A by the amount of the exhaust gas yields the amount of the adsorbed oxygen Va. Strictly speaking, the difference between the air excess coefficients λin and λout is multiplied by the amount of the exhaust gas at that time. However, since these differences occur only for a short period of time, taking the amount of exhaust gas to be fixed does not result in large error. Since the integrated value A is related to the amount of the adsorbed oxygen Va immediately after terminating NOx regeneration rich combustion, the integrated value A is also related to the degree of deterioration due to sulfur poisoning. Using the relationship between the integrated value A and the degree of deterioration due to sulfur poisoning, the degree of catalyst deterioration due to sulfur poisoning is estimated from the integrated value A of the differences between the detected air excess coefficients λin and λout on the inlet and outlet sides, respectively, of the NOx occlusion reduction catalyst. In so doing, the degree of catalyst deterioration can be accurately estimated using a simple method.

Alternatively, in the above-mentioned method of controlling the NOx purification system, immediately after terminating the rich air-fuel state of the NOx regeneration control, the commencement of the sulfur poisoning regeneration control is judged using at least one value for judgment from among the following: the amount of the adsorbed and occluded oxygen, the integrated value of the differences in the oxygen concentration, and the recovery time difference that is the difference between time whereby the oxygen concentration on the outlet side of the NOx occlusion reduction catalyst returns to the lean air-fuel state and time whereby the oxygen concentration on the inlet side of the NOx occlusion reduction catalyst returns to the lean air-fuel state. When the value for judgment becomes less than a predetermined judgment value, the sulfur poisoning regeneration control is commenced. The predetermined value for judgment is decided for each value used for the judgment.

Immediately after terminating the rich air-fuel state of the NOx regeneration control, the oxygen in the lean exhaust gas is adsorbed and occluded by the NOx occlusion reduction catalyst. For this reason, as shown in FIG. 2, the recovery time difference Δta (=t8-t7) occurs when the air excess coefficients of λin and λout on the inlet and outlet sides of the catalyst return to regular combustion. Since the recovery time difference Δta is related to the amount of the adsorbed oxygen Va immediately after terminating NOx regeneration rich combustion, the recovery time difference Δta is also related to the degree of deterioration due to sulfur poisoning, as shown in FIG. 3. Using the relationship between the recovery time difference Δta and the degree of deterioration due to sulfur poisoning, the degree of catalyst deterioration due to sulfur poisoning is estimated from the detected air excess coefficients λin and λout on the inlet and outlet sides of the NOx occlusion reduction catalyst. In so doing, the degree of catalyst deterioration can be accurately estimated using a simple method.

Since the degree of sulfur poisoning can be accurately estimated using any of the above-mentioned values for judgment, sulfur poisoning regeneration can be performed at a suitable frequency and excessive sulfur poisoning regeneration can be avoided, thereby preventing the worsening of fuel consumption.

In addition, the NOx purification system for achieving the above-mentioned object involves the following. The NOx purification system is provided with an NOx occlusion reduction catalyst that occludes NOx when an air-fuel ratio of an exhaust gas in an exhaust passage of an internal combustion engine is in a lean state, and releases and reduces the occluded NOx when the air-fuel ratio is in a rich state. In addition, the NOx purification system is provided with a control device that conducts NOx regeneration control that brings the air-fuel ratio of the exhaust gas to the rich state in order to recover the NOx occlusion ability of the NOx occlusion reduction catalyst. In addition, the control device conducts sulfur poisoning regeneration control that brings the air-fuel ratio of the exhaust gas to the rich state in order to recover from catalyst deterioration due to sulfur poisoning of the NOx occlusion reduction catalyst. The control device estimates a degree of deterioration due to sulfur poisoning of the NOx occlusion reduction catalyst on the basis of the amount of the oxygen adsorbed and occluded by the NOx occlusion reduction catalyst immediately after terminating the rich air-fuel state of the NOx regeneration control.

Furthermore, in the above-mentioned NOx purification system, immediately after terminating the rich air-fuel state of the NOx regeneration control, the control device judges the commencement of the sulfur poisoning regeneration control using at least one value for judgment from among the following: the amount of the adsorbed and occluded oxygen, the integrated value of the differences in the oxygen concentration, and the recovery time difference that is the difference between the time whereby the oxygen concentration on the outlet side of the NOx occlusion reduction catalyst returns to the lean air-fuel state and the time whereby the oxygen concentration on the inlet side of the NOx occlusion reduction catalyst returns to the lean air-fuel state. When the value for judgment becomes less than a predetermined judgment value, the control device commences the sulfur poisoning regeneration control.

As a result of the NOx purification system having the above-mentioned configuration, the above-mentioned method of controlling an NOx purification system can be implemented, and similar operational advantages can be obtained.

According to an NOx purification method and NOx purification system in accordance with the present invention, the following advantages are obtained. In an NOx purification system provided with an NOx occlusion reduction catalyst for purifying NOx present in an exhaust gas of an internal combustion engine such as diesel engines, sulfur poisoning regeneration control is conducted by estimating a degree of deterioration due to sulfur poisoning on the basis of a change in an amount of adsorbed oxygen at a time of lean combustion (i.e., regular operation) after terminating rich combustion for NOx regeneration, or alternatively, on the basis of a change in an oxygen concentration (air excess coefficient, air-fuel ratio, etc.) of the NOx occlusion reduction catalyst on an inlet side and an outlet side, such an oxygen concentration being related to the amount of the adsorbed oxygen. In so doing, deterioration due to sulfur poisoning can be accurately estimated. Consequently, sulfur poisoning regeneration control can be performed at a suitable frequency and excessive sulfur poisoning regeneration control can be avoided, thereby preventing the worsening of fuel consumption.

DESCRIPTION OF EMBODIMENTS

Hereinafter, an NOx purification method and NOx purification system in accordance with embodiments of the present invention will be described with reference to the accompanying drawings. The regeneration control referred to herein includes both NOx regeneration control for recovering an NOx occluding ability of NOx-occluding substances, as well as a sulfur regeneration control that purges sulfur from a catalyst in response to catalyst sulfur poisoning due to sulfur components present in a fuel. Moreover, a rich state of an exhaust gas referred to herein does not necessarily refer to in-cylinder rich combustion, but to a rich state wherein a ratio of the amount of supplied air in the exhaust gas inflowing to the NOx occlusion reduction catalyst to the amount of the fuel (including the fuel burned in-cylinder) is near a theoretical air-fuel ratio, or the amount of the fuel is greater than that of the theoretical air-fuel ratio.

Figure 1:
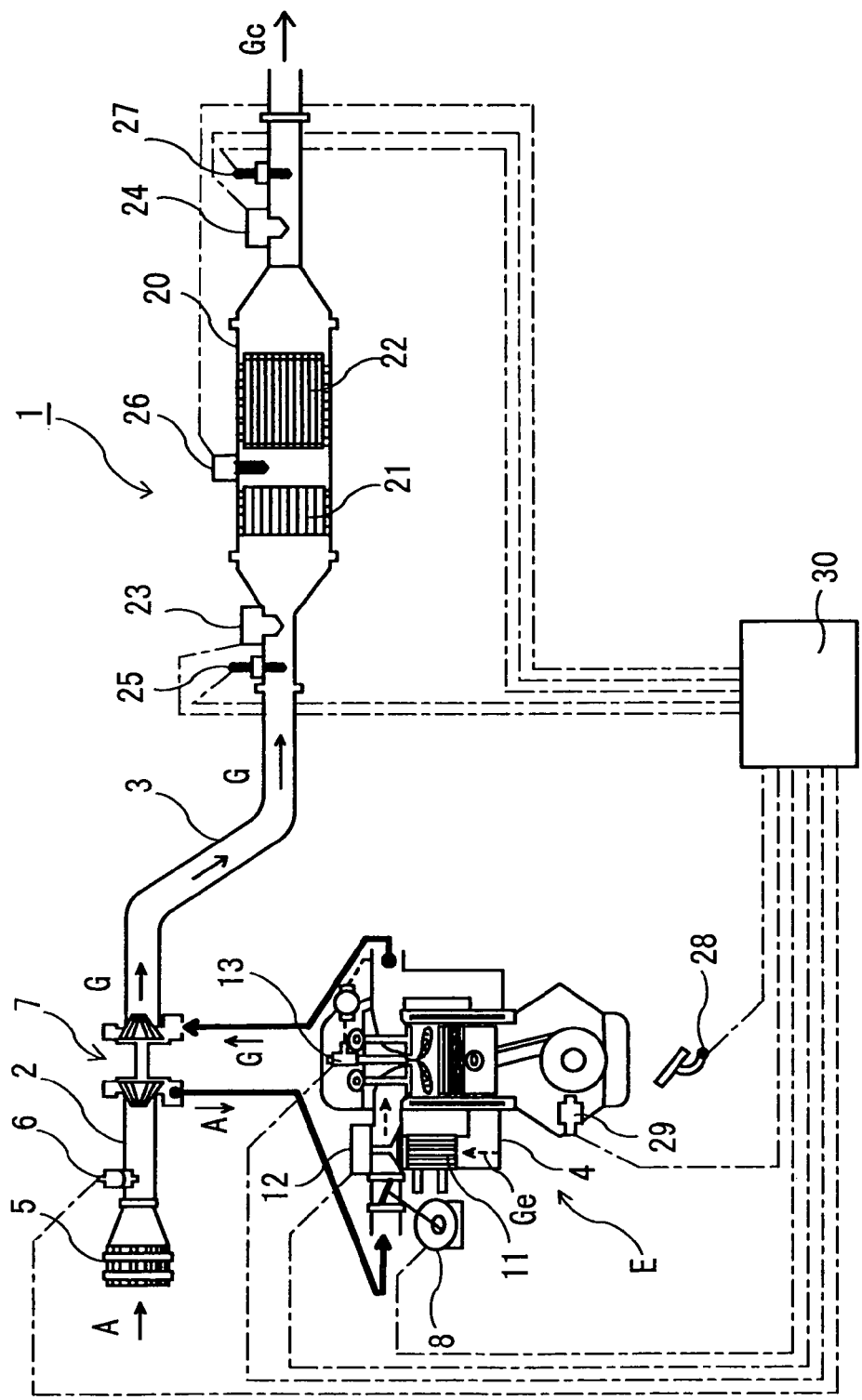
FIG. 1 is a diagram showing a configuration of an NOx purification system of an embodiment in accordance with the present invention.

FIG. 1 shows a configuration of an NOx purification system 1 of an embodiment according to the present invention. In the NOx purification system 1, an exhaust gas purification device (catalytic converter) 20 is disposed in an exhaust passage 3 of an engine (internal combustion engine) E. The exhaust gas purification device 20 includes an oxidation catalyst 21 and an NOx occlusion reduction catalyst 22.

The oxidation catalyst 21 is formed by providing a catalyst coat layer such as active aluminum oxide ($Al_2O_3$) on the surface of a honeycomb-shaped support body made of cordierite or heat-resistant steel. Upon the catalyst coat layer are supported catalytic activating components made of noble metals such as platinum (Pt), palladium (Pd), and rhodium (Rh). The catalytic activating components oxidize substances such as HC and CO present in an inflowing exhaust gas, to put the exhaust gas in a low-oxygen state and to raise an exhaust temperature by heat of combustion.

The NOx occlusion reduction catalyst 22 is configured by providing a catalyst coat layer upon a monolithic catalyst formed of cordierite or silicon carbide (SiC) or ultra-thin stainless steel sheets. The catalyst coat layer is formed of substances such as aluminum oxide ($Al_2O_3$) and titanium oxide (TiO). Upon the catalyst coat layer are supported catalyst metals such as platinum (Pt) and palladium (Pd), as well as an NOx occluder (NOx-occluding substance) such as barium (Ba). The support body of the monolithic catalyst structural material has a large number of cells. The catalyst coat layer provided on the inner walls of these cells has a large surface area, thereby raising an efficiency to contact with the exhaust gas.

In the NOx occlusion reduction catalyst 22, when the exhaust gas is in a state of a high oxygen concentration (i.e., lean air-fuel state), the NOx occluder occludes the NOx in the exhaust gas so that the NOx present in the exhaust gas is purified. When the exhaust gas is in a state of a low or zero oxygen concentration (i.e., rich air-fuel state), the occluded NOx is released, and simultaneously the released NOx is reduced by the catalytic action of the catalyst metal, thereby preventing the emission of the NOx into the atmosphere.

Additionally, an inlet-side air excess coefficient ($\lambda$) sensor 23 is disposed upstream of the oxidation catalyst 21, and an outlet-side air excess coefficient sensor 24 is disposed downstream of the NOx occlusion reduction catalyst 22. In addition, in order to detect an exhaust gas temperature, a first temperature sensor 25 is disposed upstream of the oxidation catalyst 21, a second temperature sensor 26 is disposed between the oxidation catalyst 21 and the NOx occlusion reduction catalyst 22, and furthermore, a third temperature sensor 27 is disposed downstream of the NOx occlusion reduction catalyst 22.

Furthermore, a control device (ECU: engine control unit) 30 is also provided, the control device 30 conducting overall control of the operation of the engine E as well as conducting recovery control for the NOx purification ability of the NOx occlusion reduction catalyst 22. Detected values from the inlet-side and outlet-side air excess coefficient sensors 23 and 24, the first through the third temperature sensors 25, 26, and 27, a load sensor 28 that detects the state of the accelerator pedal, and a crank angle sensor 29 are input into the control device 30. The control device 30 outputs the signals for controlling an intake throttle valve 8 and an EGR valve 12 of the engine E, as well as a fuel injection valve 13 of an electronically controlled, common rail fuel injection device for fuel injection.

In the NOx purification system 1, air A passes through an air purifier 5 and a mass air flow sensor (MAF sensor) 6 in an intake passage 2. Subsequently, the air A is compressed and pressurized by a compressor of a turbocharger 7. The amount of the air A is then adjusted by the intake throttle valve 8 before going in-cylinder by way of an intake manifold. Additionally, the exhaust gas G generated in-cylinder enters the exhaust passage 3 from an exhaust manifold, thereby driving a turbine of the turbocharger 7. Subsequently, the exhaust gas G passes through the exhaust gas purification device 20, thereby becoming a purified exhaust gas Gc, which is then exhausted into the atmosphere via a muffler not shown. In addition, a portion of the exhaust gas G, as EGR gas Ge, passes through an EGR cooler 11 in an EGR passage 4, the amount thereof is adjusted by the EGR valve 12, and then is re-circulated into the intake manifold.

Furthermore, in the present invention, a recovery time difference $\Delta ta$ is detected that is the difference between the inlet-side air excess coefficient $\lambda in$ detected by the inlet-side air excess coefficient sensor 23 and the outlet-side air excess coefficient $\lambda out$ detected by the outlet-side air excess coefficient sensor 24. Using the recovery time difference $\Delta ta$, a degree of deterioration of the NOx occlusion reduction catalyst 22 due to sulfur poisoning is detected and evaluated, based on the relationship between a preset recovery time difference $\Delta ta$ and the degree of deterioration due to sulfur poisoning. Hereinafter, this detection and evaluation of the degree of deterioration will be described in further detail.

Figure 2:
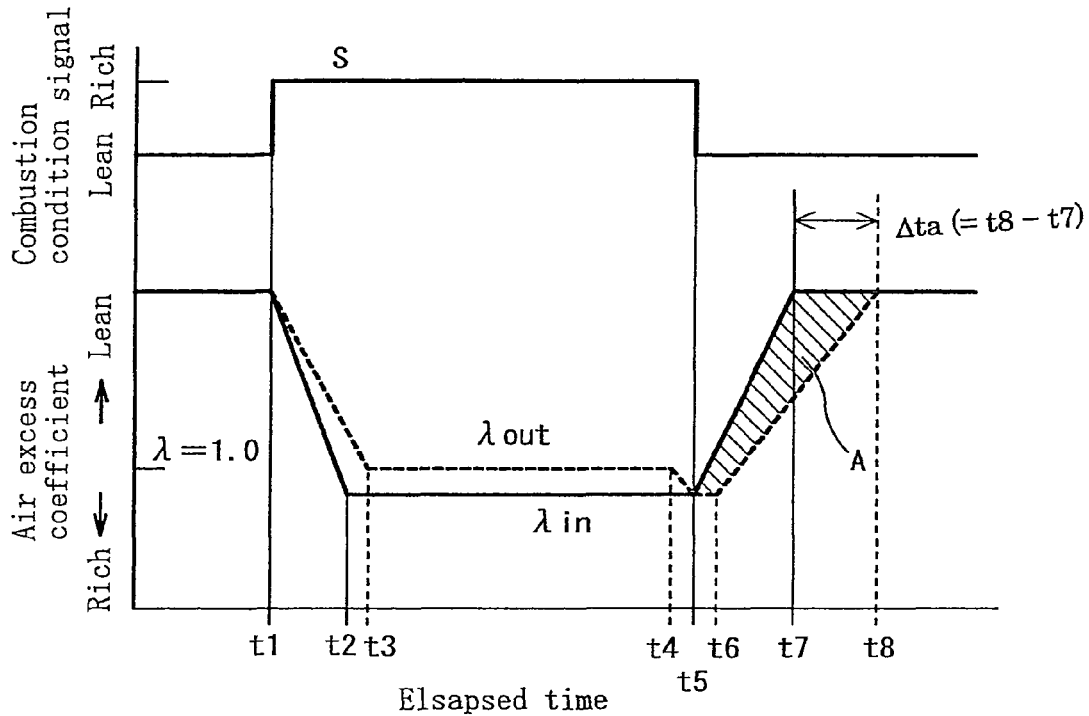
FIG. 2 is a time-series diagram showing the air excess coefficients on the inlet side and outlet side of an NOx occlusion reduction catalyst during NOx regeneration control.

FIG. 2 schematically shows a time series, during the NOx regeneration control, of a combustion condition signal S (upper solid line) that indicates combustion conditions, the output value $\lambda in$ (dotted line) of the inlet-side air excess coefficient sensor 23, and the output value $\lambda out$ (solid line) of the outlet-side air excess coefficient sensor 24.

As shown by the combustion condition signal S in FIG. 2, in an ordinary lean combustion state, the signal S indicates LEAN, and lean operation is conducted. In the lean air-fuel state, the NOx present in exhaust gas is occluded by the NOx occlusion reduction catalyst 22, and the exhaust gas G is purified. When the NOx is occluded by the NOx occlusion reduction catalyst 22 and the NOx occlusion reduction catalyst 22 reaches a state of saturation, the combustion condition signal issues an instruction to switch to rich combustion (time t1), and the state of the engine E switches to rich combustion.

Rich combustion is maintained, and when the NOx is released and the NOx occlusion reduction catalyst 22 is regenerated, the combustion condition signal issues an instruction to switch back to lean combustion (time t5), and the state of the engine E switches to ordinary, lean combustion. The above-mentioned operation is repeated.

During this time series, the inlet-side air excess coefficient $\lambda$in and the outlet-side air excess coefficient $\lambda$out exhibit the changes as shown in the lower part of FIG. 2. When the combustion condition signal S switches to rich combustion (t1), the inlet-side air excess coefficient $\lambda$in suddenly drops to a rich air-fuel ratio, wherein $\lambda=1$ or less (t2). At this point, the outlet-side air excess coefficient $\lambda$out is slightly delayed and becomes a weakly rich air excess coefficient of approximately $\lambda=1$, a little leaner than the inlet-side air excess coefficient $\lambda$in (t3). Subsequently, the inlet-side and outlet-side air excess coefficients $\lambda$in and $\lambda$out transit while maintaining the difference (t3-t4). The difference occurs because the oxygen ($O_2$) from the NOx released from the catalyst surface and the NOx-occluding agent of the NOx occlusion reduction catalyst 22 is consumed so that the outlet-side air excess coefficient $\lambda$out downstream of the catalyst becomes leaner. When all of the oxygen from the NOx released from the catalyst surface and the NOx-occluding agent of the NOx occlusion reduction catalyst 22 is consumed, the inlet-side and outlet-side air excess coefficients $\lambda$in and $\lambda$out become equal (t5). At this point (t5), all of the oxygen on the catalyst surface and released from the NOx-occluding agent of the NOx occlusion reduction catalyst 22 has been lost. At this point (t5), all of the occluded NOx has also been released, and the regeneration of the NOx occlusion reduction catalyst 22 is complete. Consequently, rich combustion is terminated (t5).

By terminating rich combustion, the inlet-side air excess coefficient $\lambda$in returns to a lean state (lean exhaust gas state) (t5-t7). However, the outlet-side air excess coefficient $\lambda$out returns to the lean state slightly later than the inlet-side air excess coefficient $\lambda$in (t6-t8) does. Moreover, the slope of the return to the lean state (t6-t8) is gentler than the slope of the inlet-side air excess coefficient $\lambda$in (t5-t7), and thus more time is needed.

This phenomenon is caused since after entering the lean state at time t5, the oxygen is adsorbed and occluded at the catalyst surface and the NOx-occluding agent of the NOx occlusion reduction catalyst 22. When the NOx occlusion reduction catalyst 22 is deteriorated by sulfur in the exhaust gas, the amount of the adsorbed and occluded oxygen is decreased. The amount of the adsorbed and occluded oxygen is related to the portion A (shaded portion) enclosed by $\lambda$in and $\lambda$out between t5 and t8. By converting an integrated value A of a difference between $\lambda$in and $\lambda$out into the oxygen concentration, and then multiplying the oxygen concentration by the amount of the exhaust gas, the amount of the adsorbed oxygen Va is obtained. As the degree of catalyst deterioration due to sulfur poisoning progresses, the amount of the adsorbed oxygen Va is decreased. In other words, sulfur poisoning occurs because of strong sulfur adsorption and occlusion by the catalyst. For this reason, in the catalyst where sulfur poisoning is progressing, active sites for oxygen adsorption and occlusion are lost and the amount of the adsorbed oxygen is reduced, and thus the above-mentioned phenomenon occurs. On the basis of the amount of the adsorbed oxygen Va or the integrated value A, the degree of catalyst deterioration due to sulfur poisoning is estimated and evaluated.

Furthermore, because of oxygen adsorption and occlusion, the recovery time whereby the outlet-side air excess coefficient $\lambda$out returns to the lean state shortens. In other words, the recovery time difference $\Delta ta$ (=t8-t7) between the time (t8) at which the outlet-side air excess coefficient $\lambda$out returns to the lean state and the time (t7) at which the inlet-side air excess coefficient $\lambda$in returns to the lean state shortens.

Figure 3:
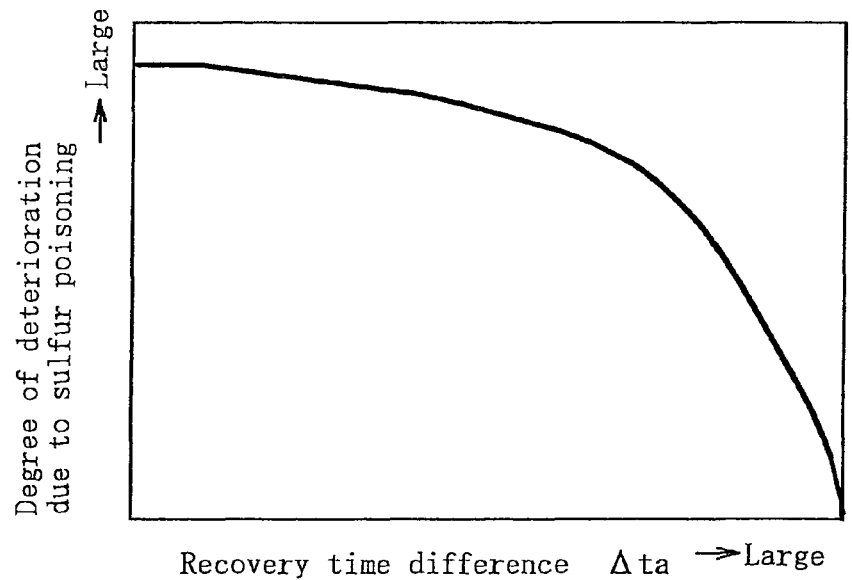
FIG. 3 is a diagram showing a relationship between a recovery time difference between inlet-side and outlet side air excess coefficients, and a degree of deterioration due to sulfur poisoning.

As a result of this phenomenon, the recovery time difference $\Delta ta$ varies according to the degree of deterioration due to sulfur poisoning, as shown in FIG. 3, and $\Delta ta$ becomes shorter as the degree of deterioration due to sulfur poisoning becomes larger. In other words, when the recovery time difference $\Delta ta$ becomes smaller, then catalyst deterioration has progressed. Consequently, by detecting the recovery time difference $\Delta ta$ instead of the amount of the adsorbed oxygen Va, the degree of catalyst deterioration due to sulfur can be detected.

In other words, the degree of catalyst deterioration due to sulfur can be directly detected and evaluated from information that indicates the state of the NOx occlusion reduction catalyst 22, such as the amount of the adsorbed oxygen Va or the recovery time difference $\Delta ta$, and not indirect information such as the amount of fuel consumption.

Next, a method of controlling an NOx purification system will be described. In this embodiment, the control device of the NOx purification system 1 is built into the control device 30 of the engine E. The control device of the NOx purification system 1 conducts control of the NOx purification system 1 in parallel to operational control of the engine E. The control device of the NOx purification system 1 is configured to include regeneration start judgment means, regeneration maintenance control means, and regeneration stop judgment means.

In the case of the NOx regeneration control, the regeneration start judgment means, for example, computes an NOx emission amount per unit time, $\Delta NOx$, from the operational state of the engine, and then judges to start the NOx regeneration control when the cumulative NOx value $\Sigma NOx$ obtained by summing $\Delta NOx$ has exceeded a predetermined judgment value Cn. In other words, when the estimated amount of the occluded NOx estimated to have been occluded by the NOx occlusion reduction catalyst 22 is judged to have reached the predetermined judgment value, then the NOx regeneration control is conducted in order to recover the NOx purification ability of the NOx occlusion reduction catalyst 22.

Additionally, in the present invention, in the case of the sulfur control for recovery from sulfur poisoning, the regeneration start judgment means detects the amount of the adsorbed oxygen A or the recovery time difference $\Delta ta$. When the amount of the adsorbed oxygen Va has become smaller than a predetermined judgment value Vc, or alternatively, when the recovery time difference $\Delta ta$ has become smaller than a predetermined judgment value tc, the regeneration start judgment means judges to start sulfur poisoning regeneration. The amount of the adsorbed oxygen A is the difference between the inlet-side air excess coefficient $\lambda$in detected by the inlet-side air excess coefficient sensor 23, and the outlet-side air excess coefficient $\lambda$out detected by the outlet-side air excess coefficient sensor 24. In addition, the recovery time difference $\Delta ta$ is the difference between the time t8 whereby the outlet-side air excess coefficient $\lambda$out returns to the lean air-fuel state, and the time t7 whereby the inlet-side air excess coefficient $\lambda$in returns to the lean air-fuel state.

In addition, the regeneration maintenance control means conducts control like the following. The regeneration maintenance control means respectively computes target exhaust gas temperatures and target air-fuel ratios (target air excess coefficients) suitable for use during NOx regeneration and during sulfur poisoning regeneration, the target air-fuel ratios being either stoichiometric air-fuel ratios (i.e., theoretical air-fuel ratios) or rich air-fuel ratios. The regeneration maintenance control means then controls an intake system and a fuel system, using an intake system rich control that reduces an intake amount and a fuel system rich control that increases a fuel amount, such that the exhaust gas temperature becomes the target exhaust gas temperature and the air-fuel ratio (air excess coefficient λ) becomes the target air-fuel ratio (target air excess coefficient). The regeneration maintenance control means also controls the intake system and the fuel system such that the target state is maintained and continued.

In NOx regeneration, the target exhaust gas temperature is approximately 200° C. to 600° C., depending on the catalyst, while the target air-fuel ratio, when converted to the air excess coefficient (λ), is approximately 0.8 to 1.0, depending on the catalyst. In sulfur poisoning regeneration, the target exhaust gas temperature is approximately 500° C. to 750° C., depending on the catalyst, while the target air-fuel ratio, when converted to the air excess coefficient (λ), is approximately 0.8 to 1.0, depending on the catalyst.

In the case of the NOx regeneration control, the regeneration stop judgment means conducts judgment like the following. For example, the regeneration stop judgment means judges to stop the NOx regeneration control when the duration of the NOx regeneration control has passed a predetermined amount of time. Alternatively, the regeneration stop judgment means computes an amount per unit time of the NOx released from the NOx occlusion reduction catalyst 22 from the operational state of the engine, and judges to stop the NOx regeneration control when the cumulative NOx release value obtained by summing the amount per unit time of the released NOx has exceeded the predetermined judgment value. In addition, in the case of the sulfur poisoning regeneration control, the regeneration stop judgment means, for example, takes the sum of the sulfur purge amounts, and judges to stop the sulfur poisoning regeneration control when the cumulative sulfur purge amount has exceeded the accumulated amount of sulfur present when regeneration is started.

As a result of the method of controlling the NOx purification system and the NOx purification system 1 having the above-mentioned configuration, the following is achieved. Sulfur poisoning regeneration control is conducted by estimating the degree of deterioration due to sulfur poisoning on the basis of the amount of the oxygen Va adsorbed and occluded by the NOx occlusion reduction catalyst 22 at the time of returning to lean (ordinary) combustion after terminating rich combustion for NOx regeneration, or alternatively, on the basis of the change (the integrated value A, or the recovery time difference Δta, for example) in the oxygen concentrations λin and λout between the inlet side and the outlet side of the NOx occlusion reduction catalyst 22. In so doing, sulfur poisoning regeneration control can be performed at a suitable frequency. For this reason, excessive sulfur poisoning regeneration control can be avoided, thereby preventing the worsening of fuel consumption.

INDUSTRIAL APPLICABILITY

The NOx purification method and NOx purification system of the present invention, having the excellent advantages described above, can be put to highly effective use with respect to an NOx purification system mounted on an automobile internal combustion engine and provided with the NOx occlusion reduction catalyst in the exhaust passage of the internal combustion engine.

What is claimed is:
1. An NOx purification system, comprising:
an NOx occlusion reduction catalyst that occludes NOx, when an air-fuel ratio of an exhaust gas in an exhaust passage of an internal combustion engine is in a lean state, and releases and reduces the occluded NOx when the air-fuel ratio of the exhaust gas is in a rich state; and
a control device including an NOx regeneration controller that includes a preset commencing condition for an NOx regeneration and a preset termination condition for the NOx regeneration and that, at the preset commencement condition, brings the air-fuel ratio of the exhaust gas to the rich state in order to recover an NOx occlusion ability of the NOx occlusion reduction catalyst, and a sulfur poisoning regeneration controller that brings the air-fuel ratio of the exhaust gas to the rich state in order to recover from catalyst deterioration due to sulfur poisoning of the NOx occlusion reduction catalyst,
wherein the control device estimates a degree of the deterioration, immediately after terminating the rich air-fuel state of the NOx regeneration control brought on by the preset termination condition, based on a calculation of an integrated value of a difference between an oxygen concentration on an outlet side of the NOx occlusion reduction catalyst and an oxygen concentration on an inlet side of the NOx occlusion reduction catalyst, and
wherein the calculation of the integrated value occurs when the oxygen concentration on the inlet side of the catalyst and the oxygen concentration on the outlet side of the catalyst become equal.

2. The NOx purification system according to claim 1, wherein the control device commences sulfur poisoning regeneration control when the integrated value becomes less than a predetermined value.

3. A method of controlling an NOx purification system including an NOx occlusion reduction catalyst that occludes NOx, when an air-fuel ratio of an exhaust gas in an exhaust passage of an internal combustion engine is in a lean state, and releases and reduces the occluded NOx when the air-fuel ratio of the exhaust gas is in a rich state, the method comprising:
presetting a commencing condition of an NOx regeneration, and a terminating condition of the NOx regeneration;
controlling the NOx regeneration brought on by the preset commencement condition by bringing the air-fuel ratio of the exhaust gas to the rich state in order to recover an NOx occlusion ability of the NOx occlusion reduction catalyst;
controlling sulfur poisoning regeneration by bringing the air-fuel ratio of the exhaust gas to the rich state in order to recover from catalyst deterioration due to sulfur poisoning of the NOx occlusion reduction catalyst;
estimating a degree of the deterioration, immediately after terminating the rich air-fuel state of the NOx regeneration control brought on by the preset termination condition, based on calculating an integrated value of a difference between an oxygen concentration on an outlet side of the NOx occlusion reduction catalyst and an oxygen concentration on an inlet side of the NOx occlusion reduction catalyst; and
calculating the integrated value when the oxygen concentration on the inlet side of the catalyst and the oxygen concentration on the outlet side of the catalyst become equal.

4. The method of controlling an NOx purification system according to claim 3, wherein commencement of sulfur poisoning regeneration begins when the integrated value becomes less than a predetermined value.

* * * * *